(12) United States Patent
Chen et al.

(10) Patent No.: US 10,214,231 B2
(45) Date of Patent: Feb. 26, 2019

(54) TROLLEY BASEPLATE AND TROLLEY USING THE SAME

(71) Applicant: CHIGOO INTERACTIVE TECHNOLOGY CO., LTD., Wuxi, Jiangsu (CN)

(72) Inventors: Tao Chen, Wuxi (CN); Chuanrong Pan, Wuxi (CN); Rong Han, Wuxi (CN)

(73) Assignee: CHIGOO INTERACTIVE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/513,169

(22) PCT Filed: Sep. 24, 2015

(86) PCT No.: PCT/CN2015/090537
§ 371 (c)(1),
(2) Date: Mar. 22, 2017

(87) PCT Pub. No.: WO2016/045603
PCT Pub. Date: Mar. 31, 2016

(65) Prior Publication Data
US 2017/0305451 A1    Oct. 26, 2017

(30) Foreign Application Priority Data
Sep. 25, 2014    (CN) .................... 2014 2 0557929 U (51) Int. Cl.
*B62B 3/14* (2006.01)
*B62B 5/00* (2006.01)
(Continued)

(52) U.S. Cl.
CPC ........ *B62B 3/1404* (2013.01); *B60L 11/1818* (2013.01); *B62B 3/1416* (2013.01);
(Continued)

(58) Field of Classification Search
CPC ....... B62B 3/14; B62B 3/1404; B62B 3/1416; B62B 3/1468; B62B 3/02; B62B 1/04; B62B 1/12; B62B 1/20
See application file for complete search history.

(56) References Cited

U.S. PATENT DOCUMENTS

| | | | | |
|---|---|---|---|---|
| 3,907,322 A | * | 9/1975 | Kiryu ........................ | B62B 1/12 280/47.23 |
| 6,264,216 B1 | * | 7/2001 | Wilson ...................... | B62B 1/00 280/30 |

(Continued)

FOREIGN PATENT DOCUMENTS

| | | |
|---|---|---|
| CN | 201484459 U | 5/2010 |
| CN | 102774408 A | 11/2012 |

(Continued)

OTHER PUBLICATIONS

Supplementary European Search Report of EP 15844067.7, EPO, Munich, dated Aug. 18, 2017, with summary attached.

(Continued)

*Primary Examiner* — Erez Gurari
(74) *Attorney, Agent, or Firm* — Stephen T. Olson; Harness, Dickey & Pierce, P.L.C.

(57) ABSTRACT

Disclosed is a trolley baseplate including a plate body having a head end and a tail end, a first locking mechanism on the plate body adjacent to the head end and a second locking mechanism on the plate body adjacent to the tail end. The second locking mechanism is placed corresponding to the first locking mechanism and the structures of the two locking mechanism are fitting. When front and back trolleys are concatenated, the tail end of the front trolley and the head end of the back trolley can be locked to each other by means of the first locking mechanism and the second locking mechanism. The trolleys with the above structures can be concatenated more conveniently, and are not liable to over- (Continued)

turn upon sudden braking or turning, which can effectively shorten the time for the staff to fasten two trolleys together.

7 Claims, 6 Drawing Sheets

(51) Int. Cl.
*H02J 7/00* (2006.01)
*B60L 11/18* (2006.01)

(52) U.S. Cl.
CPC .......... *B62B 3/1424* (2013.01); *B62B 3/1468* (2013.01); *B62B 5/00* (2013.01); *H02J 7/0045* (2013.01); *B60L 2200/22* (2013.01)

(56) References Cited

U.S. PATENT DOCUMENTS

| | | | | |
|---|---|---|---|---|
| 6,315,306 B1* | 11/2001 | Fernie | ...................... | A61G 5/00 280/33.991 |
| 6,926,291 B1* | 8/2005 | Ondrasik | .............. | B62B 3/1404 280/33.991 |
| 2004/0144601 A1* | 7/2004 | Otterson | ................... | B62B 5/04 188/19 |
| 2011/0056253 A1* | 3/2011 | Greiner | ................. | B62B 3/1404 70/85 |

FOREIGN PATENT DOCUMENTS

| | | |
|---|---|---|
| CN | 203071613 U | 7/2013 |
| CN | 203481526 U | 3/2014 |
| CN | 203481526 U | 3/2014 |
| CN | 203496964 U | 3/2014 |
| CN | 203496964 U | 3/2014 |
| CN | 203544055 U | 4/2014 |
| CN | 204161416 U | 2/2015 |
| DE | 2350308 A1 | 4/1975 |

OTHER PUBLICATIONS

International Search Report (English and Chinese) for PCT/CN2015/090537, ISA/CN, Haidian District, Beijing, dated Jan. 11, 2016.
Written Opinion of the ISA for PCT/CN2015/090537, (in Chinese) ISA/CN, Haidian District, Beijing, dated Jan. 11, 2016.
Japanese Office Action in parallel application JP 2017-516926, Notification of Reasons for Refusal, dated Apr. 4, 2018 with English translation.
Korean Office Action in parallel application KR 10-2017-7008115, Notification of Reason for Refusal, dated Jan. 2, 2018, with English translation.
U.S. Office Action in related U.S. Appl. No. 15/835,699, dated Jun. 13, 2018.

* cited by examiner

TROLLEY BASEPLATE AND TROLLEY USING THE SAME

CROSS-REFERENCE TO RELATED APPLICATIONS

This application is a 371 U.S. National Stage of International Application No. PCT/CN2015/090537, filed Sep. 24, 2015, which claims the benefit of Chinese Patent Application No. 201420557929.X, filed Sep. 25, 2014. The disclosures of the above applications are incorporated herein by reference.

TECHNICAL FIELD

The present invention generally relates to trolley or handcart, and in particular to a trolley baseplate for preventing a trolley from overturning and a multimedia trolley using the same.

BACKGROUND

In public places with a large area and complex environment, such as airport, it is difficult to accurately find and quickly reach a destination due to the various miscellaneous indicators. At present, small vehicles, such as multimedia trolleys equipped with intelligent mobile service terminals or the like, are put in public places for people to use. Theses multimedia trolleys can assist people to transport goods and quickly guide people to reach their destinations by using multimedia playing devices installed thereon, thus providing convenience to the users. It is necessary to frequently charge the battery of the mobile service terminal of a trolley due to the frequent use of the multimedia trolley. Multiple conventional multimedia trolleys are concatenated in tandem to form a series circuit of charging connectors and then pushed to a charging facility for simultaneous charging. Due to the fact that the public places are always crowded with people, it may be necessary to brake or turn suddenly when encountering obstacles such as people or luggage. When the existing multiple multimedia trolleys are pushed forward in a concatenated manner, as lacking of a stop means between a front trolley and a back trolley, a sudden brake or turn will cause the trolley to lean forward and even overturn due to an unsteady gravity center of the trolley. Even worse, this may also lead to damage of the multimedia player installed on the trolley. In addition, when the trolleys are pushed forward in a concatenated manner, how to accurately and reliably connect the charging connectors of the front and back trolleys to shorten the time for the staff to check the circuit is also a problem demanding prompt solution.

SUMMARY

In view of the above defect in the prior art, the present invention provides a trolley baseplate including: a plate body having a head end and a tail end, a first locking mechanism arranged on the plate body adjacent to the head end and a second locking mechanism arranged on the plate body adjacent to the tail end. The second locking mechanism is provided corresponding to the position of the first locking mechanism and the configurations of the two locking mechanism are complementary.

According to the present invention, when two trolleys are connected in tandem, the tail end of the plate body of the front trolley and the head end of the plate body of the back trolley can be locked to each other by means of the first locking mechanism of the back trolley and the second locking mechanism of the front trolley. The trolleys having such a structure can be concatenated front and back more conveniently, not easy to overturn during sudden braking or turning, which can effectively shorten a time of concatenating the front and back trolleys together by a staff.

In some embodiments of the present invention, the width of the tail end is greater than that of the head end and the tail end is formed with an accommodating space. The plate body includes two side portions. The first locking mechanism is provided on an outer wall of at least one of the two side portions and the second locking mechanism is provided on an inner wall of a side portion where the first locking mechanism locates.

In this embodiment, the tail end of the plate body has an accommodating space. Therefore, when the front and back plate bodies are placed in tandem, the head end of the back plate body can enter into the tail end of the front plate body. That is, a portion of the back plate body enters into the front plate body. The second locking mechanism arranged on the inner wall of the side portion of the front plate body and the first locking mechanism arranged on the outer wall of the side portion of the back plate body are locked to each other. An advantage of such a structure is that it is easy to orientate the two plate bodies and push the back plate body into the accommodating space of the front plate body, and then locking can be completed by means of the first and second locking mechanisms.

In order to make the fitting of the locking mechanism simpler and more convenient, in some embodiments of the present invention, the first locking mechanism is a male locking mechanism, and the second locking mechanism is a female locking mechanism.

In some embodiments of the present invention, the first locking mechanism includes a limiting piece protruding laterally outwardly from the side portion and the second locking mechanism includes a limiting groove. The positions of the limiting piece and the limiting groove are substantially located at the same level with a consistent length direction. The maximum lateral width of the limiting piece is smaller than or equal to the difference between the width of the tail end and the width of the head end, and the length of the limiting groove is greater than or equal to the length of the limiting piece.

In some embodiments of the present invention, the limiting piece is an arc limiting piece, so that an operator can push the limiting piece into the limiting groove without undue force, thus effectively avoiding the wear and tear between the parts and improving the service life.

In some embodiments of the present invention, the first locking mechanism includes an arc latch and the second locking mechanism includes a slope piece having an ascending slope relatively close to the tail end and a descending slope relatively far away from the tail end. And the arc latch is provided substantially at the same level as the position of the slope piece.

In some embodiments of the present invention, the height of the limiting groove is greater than the thickness of the limiting piece and smaller than the thickness of the plate body.

Since the plate body is provided with a limiting piece, a limiting groove, an arc latch and a slope piece, the shape of the limiting groove needs to be adaptive to the shape of the slope or the height of the limiting groove is slightly greater than the thickness of the limiting piece, so that the limiting piece has a certain rise and fall space.

In some embodiments of the present invention, the gradient of the ascending slope is smaller than or equal to that of the descending slope so that the arc latch can slide relatively smoothly on the ascending slope and slide relatively fast on the descending slope. The arc latch is eventually disengaged from the descending slope and is locked by the slope piece.

In this process, the plate body will be slowly lifted and then quickly fall. When the head end of the plate body is provided with a downwardly projecting arc copper piece and the tail end of the plate body is provided with a laminar copper piece as a charging connecting part, the conductive copper piece of the back trolley directly rests on the conductive copper piece of the front trolley, therefore no friction will occur between the copper pieces and then the copper pieces for electrical connection are effectively prevented from being damaged.

In some embodiments of the present invention, the arc latch has a smaller first height and a bigger second height with respect to the plate body and tends to remain at the first height which is smaller than the second height.

In some embodiments of the present invention, the arc latch tends to be maintained at the first height by means of an elastic device or its own flexibility.

In some embodiments of the present invention, the slope piece has a smaller third height and a bigger fourth height with respect to the plate body and tends to remain at the fourth height.

In some embodiments of the present invention, the slope piece tends to be maintained at the fourth height by means of an elastic device or its own flexibility.

In order to avoid the rigid contact between the arc latch and the slope piece, one of the arc latch and the slope piece can be displaced within a certain range when the other is pressed by installing an elastic device. The arc latch and the slope piece themselves may also have some flexibility. With such structures, occurrence of friction beyond the range of material tolerance between the arc latch and the slope piece can be avoided, which leads to reduced service life, thus reducing maintenance costs.

In addition, the present invention provides a trolley using the above-described baseplate.

In some embodiments of the present invention, the trolley includes a player support located above the plate body, a frame body having one end connected to the player support and the other end fixedly connected to a head end of the plate body, and a multimedia player provided on the player support, the multimedia player being capable of rotating with respect to the player support.

The trolley provided by the present invention has a simple structure, and the frame body, the baseplate and the player support can be disassembled for convenient transportation. The locking mechanisms on the baseplate of the trolley facilitate concatenating of trolleys. When the trolleys are pushed to a charging area in a concatenated manner, the locking mechanisms lock the front and back trolleys together so that the trolleys are not prone to overturning and separation.

DETAILED DESCRIPTION

Figure 1:
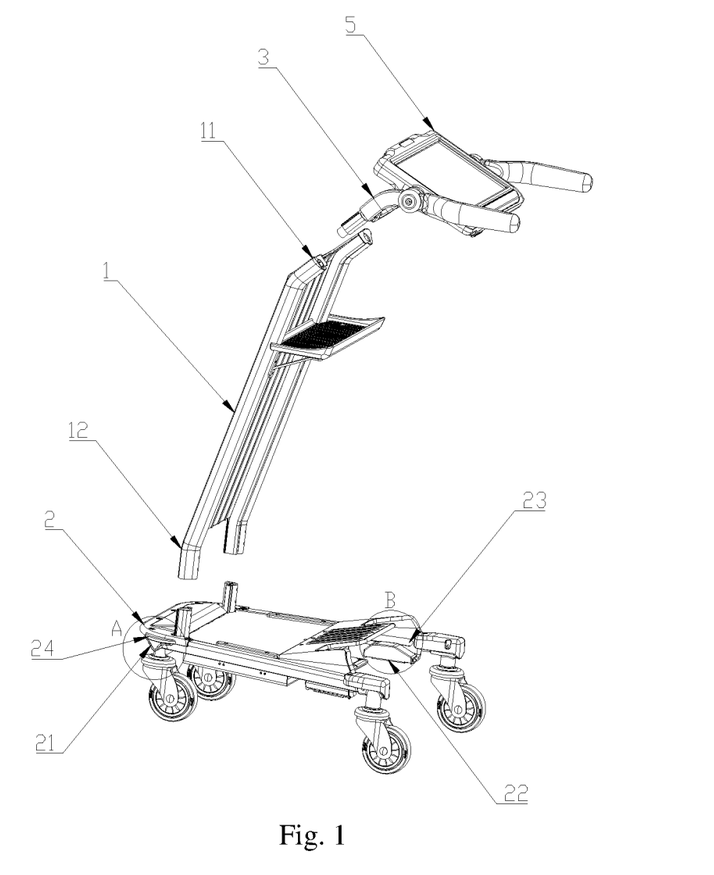
FIG. 1 is a structural schematic view showing a multimedia trolley according to an embodiment of the present invention.

FIG. 1 shows a multimedia trolley having locking mechanisms according to an embodiment of the present invention. The trolley includes a baseplate 6, a frame body 1, a player support 3, a charging connector 4 provided on the bottom of the baseplate 6 (not shown in FIG. 1 but can be referred in FIGS. 4A to 7B) and a multimedia player 5 hinged to the player support 3. The frame body 1 has an upper plug terminal 11 and a lower plug terminal 12. The player support 3 is inserted into the frame body 1 through the upper plug terminal 11 and then fastened with a pop rivet. The baseplate 6 is inserted into the frame body 1 through the lower plug terminal 12 and fastened with a pop rivet. By means of such a connection, welding points can be avoided to expose, so that the trolley as a whole has better appearance and is easy to disassemble and transport. The display plane of the multimedia player 5 is generally arranged upwardly and is rotatable with respect to the player support 3 within a certain angle range to facilitate viewing by the user from different perspectives.

Figure 2:
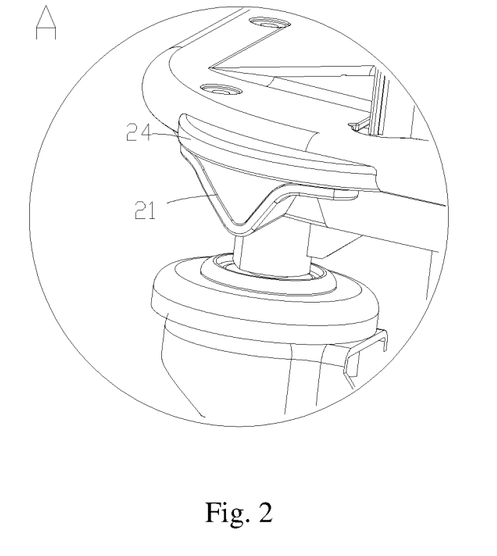
FIG. 2 is an enlarged schematic view of a portion A (a first locking mechanism) of the trolley shown in FIG. 1.
Figure 3:
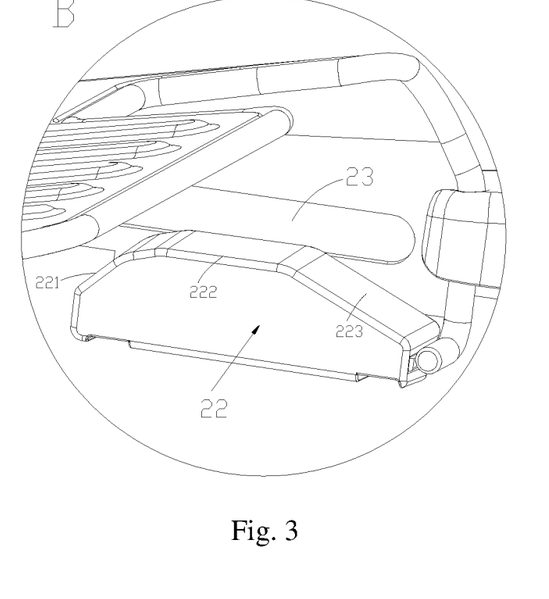
FIG. 3 is an enlarged schematic view of a portion B (a second locking mechanism) of the trolley shown in FIG. 1.
Figure 4A:
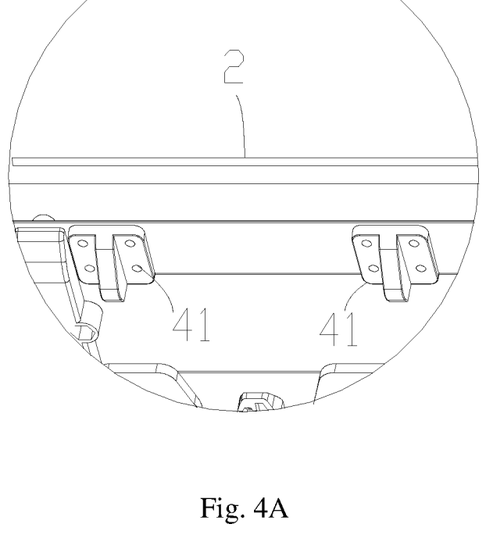
FIG. 4A is a schematic view showing a front connection end of a charging connector located on the bottom of a baseplate.
Figure 4B:
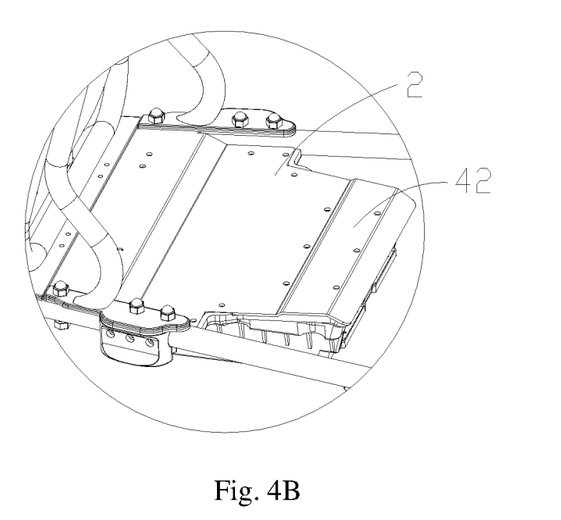
FIG. 4B is a schematic view showing a back connection end of the charging connector located on the bottom of the baseplate.

As shown in FIGS. 1 to 3, the baseplate 6 having wheels includes a plate body 2. Two opposite first locking mechanisms are provided on two sides adjacent to the head end of the plate body 2 and two opposite second locking mechanisms are provided on two sides adjacent to the tail end of the plate body 2. The structures of the first locking mechanism and the second locking mechanism are adaptive to each other and are placed correspondingly. The first locking mechanism is a male locking mechanism and the second locking mechanism is a female locking mechanism. The first locking mechanism includes a limiting piece 24 and an arc latch 21, and the second locking mechanism includes a limiting groove 23 and a slope piece 22, both of which will be described below in detail. Accordingly, when two trolleys are concatenated front and back, the first locking mechanism and the second locking mechanism cooperate with each other so that the two trolleys are fixed together.

Further, the width of the tail end of the plate body 2 is bigger than that of the head end of the plate body 2, and the tail end of the plate body 2 is formed with an accommodating space. The plate body 2 includes a left side portion and a right side portion. The first locking mechanism is provided on an outer wall of at least one of the two side portions and the second locking mechanism is provided on an inner wall of a side portion where the first locking mechanism locates. As such, the first locking mechanism and the second locking mechanism are arranged in pairs.

Referring to FIGS. 4A to 7B, the charging connector 4 includes an arc copper piece 41 arranged on the lower surface of the head end of the plate body 2 and a laminar copper piece 42 arranged on the upper surface of the tail end of the plate body 2.

The limiting piece 24 of the first locking mechanism is provided on the outer wall of the side portion of the plate body 2, which is formed as an arc protrusion. The limiting groove 23 of the second locking mechanism is provided on the inner wall of the side portion of the plate body 2 as a recess going through or not going through the inner wall. The positions of the limiting piece 24 and the limiting groove 23 are substantially at the same level and the length directions thereof are consistent with each other. The maximum lateral width of the limiting piece 24 is smaller than or equal to the difference between the width of the tail end of the plate body 2 and the width of the head end of the plate body 2. The groove length of the limiting groove 23 is greater than or equal to the length of the limiting piece 24. The height of the limiting groove 23 is bigger than the thickness of the limiting piece 24 and smaller than the thickness of the side portion of the plate body 2. When the head end of the back trolley enters into the accommodating space at the tail end of the front trolley, the limiting piece 24 of the back trolley enters into the limiting groove 23 of the front trolley so as to lock the front and back trolleys to each other and further to restrict the depth of the back trolley's entering into the accommodating space of the front trolley.

The arc latch 21 of the first locking mechanism is provided on the outer wall of the side portion of the plate body 2, which is shown as a downwardly extending protrusion. The slope piece 22 of the second locking mechanism is provided on the inner wall of the side portion of the plate body 2, which is shown as a slope block having a substantially trapezoidal cross-section. The slope piece 22 at least has an ascending slope 223 relatively close to the tail end of the plate body 2 and a descending slope 221 relatively far away from the tail end of the plate body 2. The gradient of the ascending slope 223 is smaller than or equal to that of the descending slope 221. The position of the arc latch 21 is substantially located at the same level as the position of the slope piece 22. In this embodiment, the slope piece 22 further provides a smooth middle portion 222 located between the ascending slope 223 and descending slope 221.

The positional relationship between the slope piece 22 and the arc latch 21 when two trolleys are locked and the position of the charging connector 4 in the corresponding state are shown in FIGS. 5A to 7B.

Figure 5A:
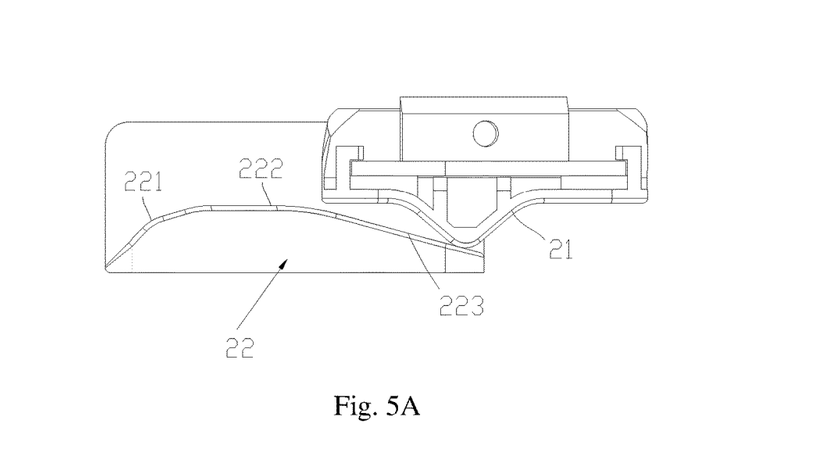
FIG. 5A is a schematic view showing an arc latch being located on an ascending slope of a slope piece when front and back trolleys are locked together.
Figure 5B:
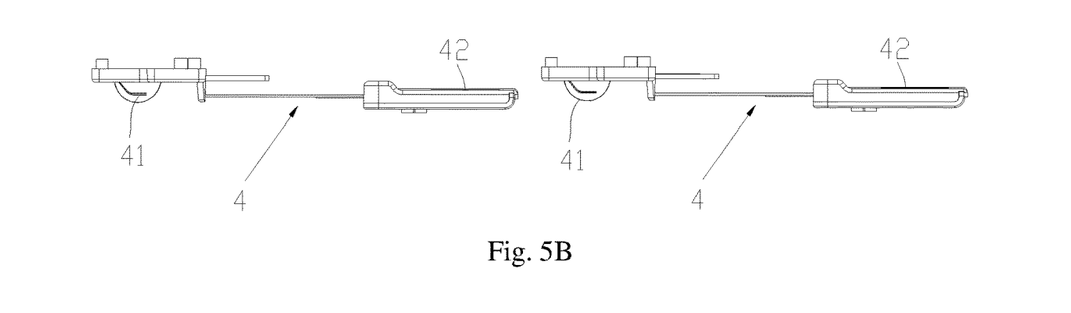
FIG. 5B is a schematic view of the positions of the baseplate and the charging connector when the arc latch is in the state shown in FIG. 5A.

When two front and back trolleys are locked, the back trolley gradually closes to the front trolley. As shown in FIG. 5A and FIG. 5B, the arc latch 21 of the back trolley slides on the ascending slope 223 of the slope piece 22 of the front trolley and the plate body 2 of the back trolley tends to be slightly lifted. The arc copper piece 41 provided at the head end of the plate body 2 of the back trolley does not contact the laminar copper piece 42 provided at the tail end of the plate body 2 of the front trolley.

Figure 6A:
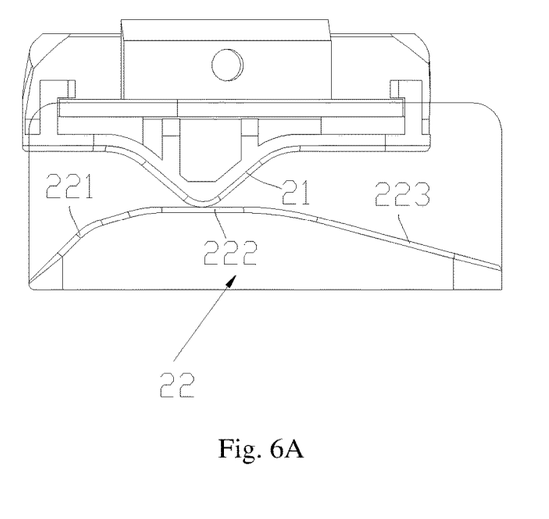
FIG. 6A is a schematic view showing the arc latch being located on a smooth portion of the slope piece when front and back trolleys are locked together.
Figure 6B:
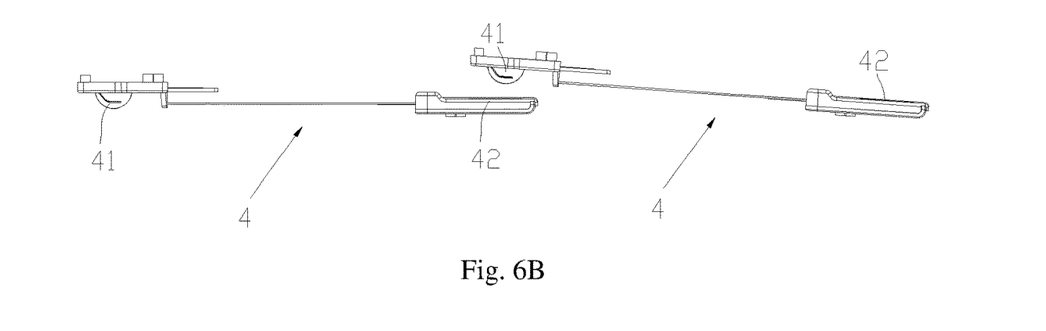
FIG. 6B is a schematic view of the positions of the baseplate and the charging connector when the arc latch is in the state shown in FIG. 6A.

As shown in FIG. 6A and FIG. 6B, as the back trolley further moves forward, the arc latch 21 of the back trolley slides on the smooth middle portion 222 of the slope piece 22 of the front trolley. The head end of the plate body 2 of the back trolley is lifted upward. The arc copper piece 41 provided at the head end of the plate body 2 of the back trolley does not contact with the laminar copper piece 42 provided at the tail end of the plate body 2 of the front trolley.

Figures 7A, 7B:
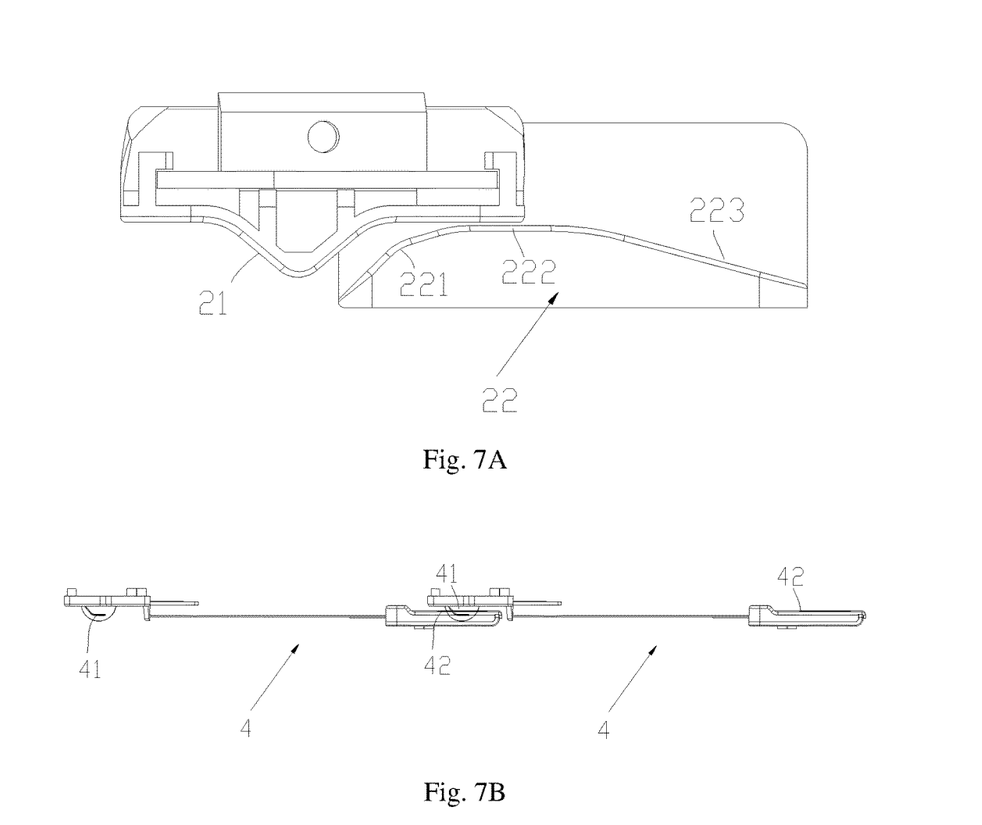
FIG. 7A is a schematic view showing the arc latch being located on a descending slope of the slope piece when front and back trolleys are locked together.
FIG. 7B is a schematic view of the positions of the baseplate and the charging connector when the arc latch is in the state shown in FIG. 7A.

As shown in FIG. 7A an FIG. 7B, when the head end of the plate body 2 of the back trolley completely enters into the accommodating space of the tail end of the plate body of the front trolley, the arc latch 21 of the back trolley slides on the descending slope 221 of the slope piece 22 of the front trolley, and eventually disengages from the descending slope 221. At this moment, the head end of the plate body 2 of the back trolley is slightly inclined downward. The arc copper piece 41 provided on the head end of the plate body 2 of the back trolley brings into instantaneous contact with the laminar copper piece 42 provided on the tail end of the plate body 2 of the front trolley. By means of this arrangement, deformation and even damage of the arc copper piece 41 and the laminar copper piece 42 resulting from being rubbed against each other during the concatenating process of the front and back trolleys can be avoided.

Due to provision of the ascending slope 223, the smooth middle portion 222 and the descending slope 221, and the gradient of the ascending slope 223 being equal to or smaller than that of the descending slope 221, an operator can easily determine the relative positions of the front and back trolleys according to the inclination direction of the plate body 2 and the magnitude of the force applied to push the back trolley and then complete the concatenating of the front and back trolleys relatively fast to fasten them together. It should be understood that the limiting groove 23 of the front trolley and the limiting piece 24 of the back trolley are simultaneously locked to each other during the completion of the concatenating process of FIGS. 5A to 7B.

A person skilled in the art can undoubtedly apply such a locking mechanism to more than two trolleys having the same structure as described above to complete the concatenating and fastening of a plurality of trolleys within a short time. The charging connectors 4 of the concatenated and locked trolleys form a series circuit and can be quickly charged. The charging connector 4 mentioned in the present invention may use the electrical connector as disclosed in Chinese Utility Model Patent (Patent Application No. 201320614839.5) filed by the same applicant, the entirety of which is incorporated herein by reference.

By using the trolley according to the present invention, an operator can easily push a plurality of trolleys which concatenated front and back to a charging area without repeatedly adjusting the mutual positions of the front trolley and the back trolley or repeatedly checking whether or not the charging connector 4 is reliably connected, which can effectively prevent two trolleys concatenated from overturning, separation or instable circuit connection during moving due to lack of a locking mechanism.

In another embodiment of the present invention, in order to avoid rigid contact between the arc latch 21 and the slope piece 22, one of the arc latch 21 and the slope piece 22 can move within a certain range when the other is pressed by installing an elastic device. For example, the arc latch 21 has a lower first height and a higher second height relative to the plate body 2 and the arc latch 21 tends to be maintained at the first height by means of the elastic device or its own flexibility, so that when the arc latch 21 contacts the slope piece 22, the arc latch 21 moves without rigid collision or friction with the slope piece 22 which may shorten service life. Of course, it shall be understood by those skilled in the art that an opposing arrangement may also be adopted. For example, the slope piece 22 has a lower third height and a higher fourth height relative to the plate body 2. The slope piece 22 tends to be maintained at the fourth height by means of an elastic device or its own flexibility, both of which can contribute to prolonging the service life and thereby reducing the maintenance cost.

Various embodiments of the present invention have been described in detail above. It shall be understood by those skilled in the art that various modifications, changes and variations can be made to the embodiments without departing from the scope of the present invention as defined by the appended claims. The scope of the claims shall be construed in its entirety and within the broadest scope consistent with the description and not limited to the examples or the embodiments described in detail.

What is claimed is:

1. A base plate of a trolley comprising:
   a plate body having a head end and a tail end;
   a first locking mechanism provided on the plate body adjacent to the head end; and
   a second locking mechanism provided on the plate body adjacent to the tail end;
   wherein the first locking mechanism and second locking mechanism are structured such that the second locking mechanism receives the first locking mechanism partially within its boundaries to produce a nesting relation,
   wherein the first locking mechanism comprises an arc latch, and the second locking mechanism comprises a slope piece having an ascending slope relatively close to the tail end and a descending slope relatively far away from the tail end, the arc latch locating at substantially the same level as a position of the slope piece.

2. The base plate of a trolley according to claim 1, wherein a width of the tail end is greater than that of the head end, an accommodating space is formed at the tail end, and the plate body includes two side portions, the first locking mechanism being provided on an outer wall of at least one of the two side portions, and the second locking mechanism being provided on an inner wall of a side portion where the first locking mechanism locates.

3. The base plate of a trolley according to claim 2, wherein the first locking mechanism comprises a limiting piece protruding laterally outwardly from the side portion, and the second locking mechanism comprises a limiting groove, the positions of the limiting piece and the limiting groove being substantially located at the same level with a consistent length direction, the maximum lateral width of the limiting piece being smaller than or equal to a difference between the width of the tail end and a width of the head end, and the length of the limiting groove being greater than or equal to the length of the limiting piece.

4. The base plate of a trolley according to claim 1, wherein a gradient of the ascending slope is smaller than or equal to that of the descending slope.

5. The according to claim 4, wherein the arc latch has a lower first height and a higher second height with respect to the plate body and tends to stay at the first height; and
   the arc latch tends to be maintained at the first height by means of an elastic device or its own flexibility.

6. The base plate of a trolley according to claim 5, wherein the slope piece has a lower third height and a higher fourth height with respect to the plate body and tends to stay at the fourth height; and
   the slope piece tends to be kept at the fourth height by means of an elastic device or its own flexibility.

7. A trolley comprising:
   a base plate including:
      a plate body having a head end and a tail end;
      a first locking mechanism provided on the plate body adjacent to the head end; and
      a second locking mechanism provided on the plate body adjacent to the tail end;
      wherein the first locking mechanism and second locking mechanism are structured such that the second locking mechanism receives the first locking mechanism partially within its boundaries to produce a nesting relation,
   a player support provided above the plate body;
   a frame body with one end connected to the player support and the other end fixedly connected to a head end of the plate body; and
   a multimedia player provided on the player support, the multimedia player being capable of rotating with respect to the player support.

* * * * *